United States Patent
Bylund et al.

(10) Patent No.: US 10,433,496 B2
(45) Date of Patent: Oct. 8, 2019

(54) BLOWER COMPRISING AN EYELET

(71) Applicant: HUSQVARNA AB, Huskvarna (SE)

(72) Inventors: Christian Bylund, Huskvarna (SE); Pär Martinsson, Jönköping (SE); Tobias Nyberg, Huskvarna (SE); Pierre Lanquist, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 38 days.

(21) Appl. No.: 15/305,169

(22) PCT Filed: Apr. 24, 2014

(86) PCT No.: PCT/EP2014/058371
§ 371 (c)(1),
(2) Date: Oct. 19, 2016

(87) PCT Pub. No.: WO2015/161884
PCT Pub. Date: Oct. 29, 2015

(65) Prior Publication Data
US 2017/0042096 A1   Feb. 16, 2017

(51) Int. Cl.
*A47L 5/14* (2006.01)
*A01G 20/43* (2018.01)
(Continued)

(52) U.S. Cl.
CPC ............ *A01G 20/43* (2018.02); *A47L 5/14* (2013.01); *B08B 5/02* (2013.01); *E01H 1/0809* (2013.01);
(Continued)

(58) Field of Classification Search
CPC ........... A01G 20/43; A01G 1/125; A47L 5/14; B08B 5/02; E01H 1/0809; E04D 13/0765; F04D 25/0673; F04D 25/08; F04D 25/084
See application file for complete search history.

(56) References Cited

U.S. PATENT DOCUMENTS 4,132,507 A * 1/1979 Akiyama ............... B05B 1/005
   15/344
4,223,419 A * 9/1980 Sato ......................... A47L 5/14
   15/327.5
(Continued)

FOREIGN PATENT DOCUMENTS

AU      2014100157 A4    3/2014
CN         2195957 Y     5/1995
(Continued)

OTHER PUBLICATIONS

"Ego Power+ 530 CFM Blower,"© 2018 Ego Power+, accessed at "https://egopowerplus.com/products/530-cfm-blower," on Apr. 25, 2018, pp. 1-7.

(Continued)

*Primary Examiner* — Robert J Scruggs
(74) *Attorney, Agent, or Firm* — Burr & Forman LLP (57) ABSTRACT

A blower (100) may include a housing (110), a blower tube (150), a fan assembly (160) and an eyelet (190). The housing (110) may include a handle portion (144) defining a handle aperture (145). The blower tube (150) may extend forward from the housing (110) and define a tube axis (152). The fan assembly (160) may be operably coupled to the blower tube (150) to force air through the blower tube (150) responsive to operation of a motor (120). The eyelet (190) may be disposed on a side portion of the housing (110) proximate to the handle aperture (145).

18 Claims, 4 Drawing Sheets

(51) Int. Cl.
*B08B 5/02* (2006.01)
*E01H 1/08* (2006.01)
*E04D 13/076* (2006.01)
*F04D 25/06* (2006.01)
*F04D 25/08* (2006.01)

(52) U.S. Cl.
CPC ..... *E04D 13/0765* (2013.01); *F04D 25/0673* (2013.01); *F04D 25/08* (2013.01)

(56) References Cited

U.S. PATENT DOCUMENTS

| | | | | |
|---|---|---|---|---|
| 5,457,846 | A * | 10/1995 | Kuwano | A47L 5/14 15/326 |
| 8,742,703 | B2 | 6/2014 | Binder et al. | |
| 9,815,188 | B2 | 11/2017 | Kaupp et al. | |
| 2009/0241285 | A1 | 10/2009 | Hinklin et al. | |
| 2013/0239361 | A1* | 9/2013 | Pellenc | A01G 20/47 15/405 |
| 2014/0082882 | A1* | 3/2014 | Kawamata | A47L 5/14 15/330 |
| 2014/0230181 | A1* | 8/2014 | Yamaoka | E01H 1/0809 15/344 |

FOREIGN PATENT DOCUMENTS

| | | |
|---|---|---|
| CN | 2321220 Y | 6/1999 |
| CN | 2364980 Y | 2/2000 |
| CN | 1972550 | 5/2007 |
| DE | 102010054841 A1 | 6/2012 |
| EP | 1253249 A2 | 10/2002 |
| EP | 2436262 A2 | 4/2012 |
| EP | 2910339 A1 | 8/2015 |
| WO | 2009009596 A1 | 1/2009 |

OTHER PUBLICATIONS

"Airion 2 Hand blower—Pellenc—Performance offering excellent comfort,"© Copyright—Pellenc, accessed at http://www.pellenc.com/blog/archives/produits/souffleur-a-main-airion-2?lang=en, on Apr. 25, 2018, pp. 1-12.

International Search Report and Written Opinion for International Application No. PCT/EP2014/058371 dated Mar. 10, 2015.

International Preliminary Report on Patentability for International Application No. PCT/EP2014/058371 dated Oct. 25, 2016.

"Airion," Catalogue 2014—Local Authorities, Green and Urban Spaces, pg. 1-112 (Mar. 13, 2014).

* cited by examiner

BLOWER COMPRISING AN EYELET

TECHNICAL FIELD

Example embodiments generally relate to outdoor power equipment and, more particularly, relate to a structure for balancing power equipment such as a blower during operation and/or transport.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be handheld, size and weight become important considerations. In some applications, the emissions (i.e., in terms of noise and/or pollutants) generated by the device may also become an important consideration. To reduce emissions, such outdoor power equipment may be selected for employment with electric motors. Battery powered units may reduce emissions and also ensure maximum mobility of the operator. However, the battery may be a relatively heavy component and the ergonomics and comfort level of the operator may be difficult to ensure if the battery throws off the balance of the device.

Thus, to improve operating conditions for operators, it may be desirable to improve the design of outdoor power equipment relative to ergonomics and operator comfort while the device is in use or transport.

BRIEF SUMMARY OF SOME EXAMPLES

Some example embodiments may therefore provide structures that facilitate a reduction in the discomfort an operator may endure by carrying imbalanced or heavy power equipment. Some embodiments may improve the balance and operability of the equipment, and may have benefits that translate into improving operating conditions and transporting of the equipment. Moreover, some embodiments may provide improvements without the significant addition of extra components or structures that may increase the size, cost and/or complexity of outdoor power equipment.

A blower of an example embodiment may include a housing, a blower tube, a fan assembly and an eyelet. The housing may include a handle portion defining a handle aperture. The blower tube may extend forward from the housing and define a tube axis. The fan assembly may be operably coupled to the blower tube to force air through the blower tube responsive to operation of a motor. The eyelet may be disposed on a side portion of the housing proximate to the handle aperture.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide structures for providing a support structure on a blower so that the blower can be more easily transported and or used. In this regard, blowers are often handled by one hand and thus, a potentially heavy weight may be supported by one arm. Moreover, the blower is typically moved side to side while operating, so the operator can expend a lot of energy pointing the blower in a desired pattern or to move material in a desired direction for a relatively long period of time. The operator can easily be tired out by such a situation.

To lighten the load for the user, either during use or while transiting between different work areas, some example embodiments may provide for the use of a belt, harness or other such support mechanism in combination with the blower. For such a support mechanism to be employed, the belt or harness must have the ability to interface with the blower and support the blower. Some example embodiments may therefore provide an eyelet on the blower at a strategically located position. The eyelet may be disposed on a top portion of one (or both) of the sides of the blower at a portion of the blower that is proximate to the center of mass or the balance point of the blower. If a simple eyelet were placed at a random or easily accessible location on the blower (e.g., an end or middle of a side), the weight distribution of the blower may rotate the blower to a unnatural and clumsy position that may inhibit operator movement or comfort. Accordingly, the eyelet of an example embodiment may be provided at a location that is both relatively accessible and also relatively close to the balance point of the blower.

Figure 1A:
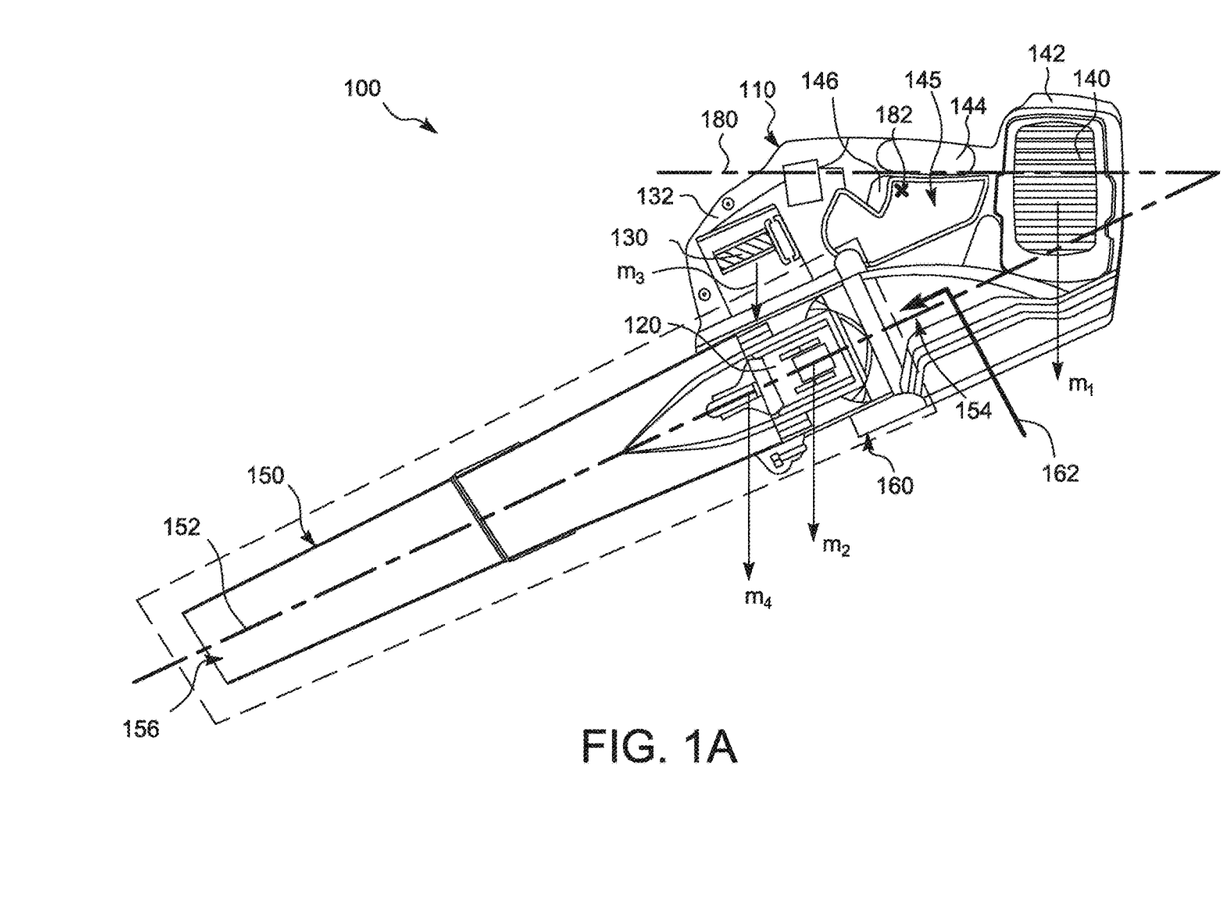
FIG. 1A illustrates a cross sectional side view of a blower in accordance with an example embodiment.
Figure 1B:
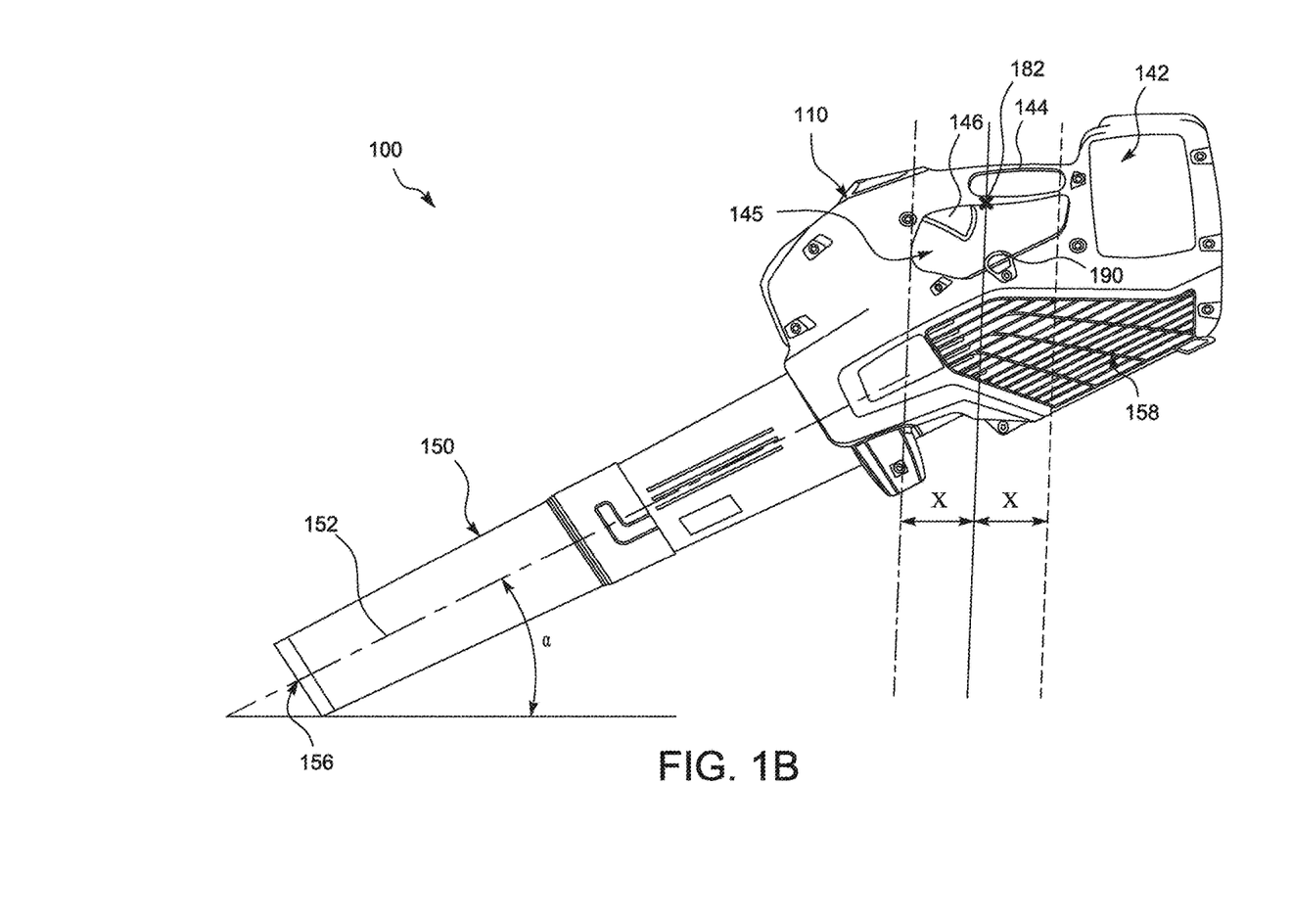
FIG. 1B, illustrates a corresponding side view of the blower in accordance with an example embodiment.
Figure 2:
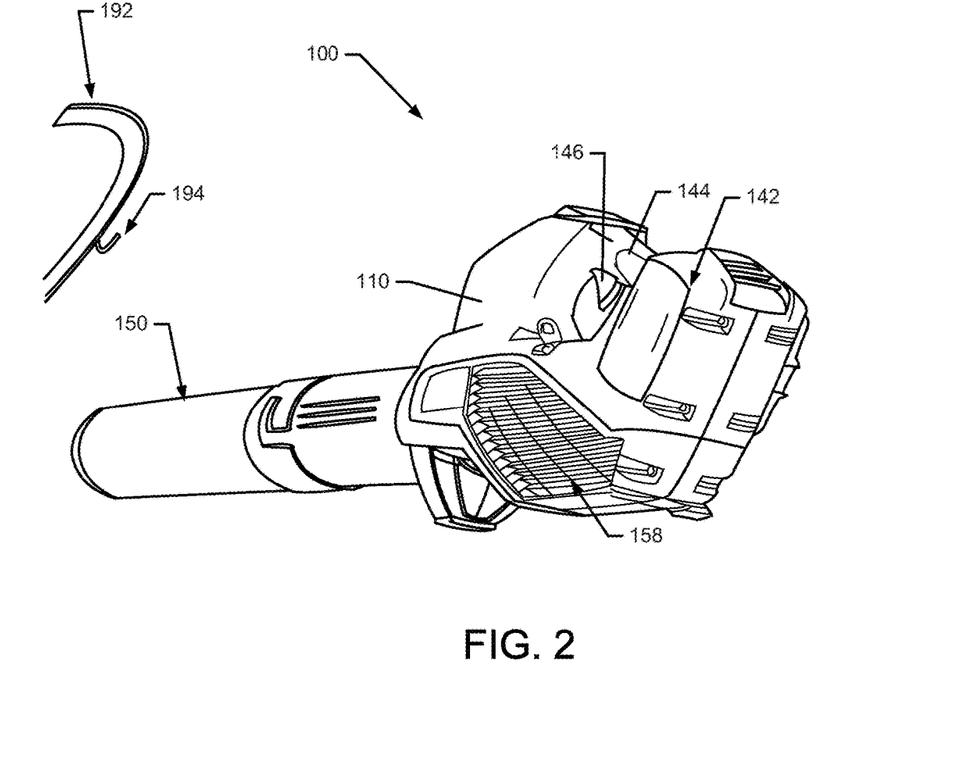
FIG. 2 illustrates a perspective side view of a blower and belt to show some structures for providing balanced transport of the blower in accordance with an example embodiment.

FIG. 1, which includes FIGS. 1A and 1B, illustrates a cross sectional view (FIG. 1A) of a blower 100 taken along a longitudinal centerline of the blower 100 and a corresponding side view (FIG. 1B) in accordance with an example embodiment. FIG. 2 illustrates a perspective side view of the blower 100 in accordance with an example embodiment. It should be appreciated that the blower 100 of FIGS. 1 and 2 merely represents one example of power equipment on which an example embodiment may be employed. Referring to FIG. 1, the blower 100 may include a housing 110 inside which various components of the blower 100 are housed. The blower 100 may further include a motor 120 or power unit for providing the driving force to move air through the blower 100. In some embodiments, the power unit may be a three phase electric motor that is operated under the control of a control unit 130 or control circuitry and powered by a battery 140 or battery adaptor. However, a DC motor could be used in some embodiments as well.

The housing 110 may be formed of plastic, composite materials, metals or any other desirable materials. In an example embodiment, the housing 110 may be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces.

In some embodiments, the control unit 130 may be housed in its own portion of the housing 110. The portion of the housing 110 in which the control unit 130 is housed may be referred to as a control unit housing portion 132, and the control unit housing portion 132 may be an integral part of a half-shell (as described above) or may be a separate housing portion that is joined to other housing portions. The control unit housing portion 132 may be disposed proximate to a portion of the housing 110 near which the motor 120 is provided.

In an example embodiment, the battery 140 may be housed in a battery compartment 142 that may be disposed at a rear portion of the housing 110, separated from the control unit housing portion 132 by a handle 144. The handle 144 may be formed by extending between a distal end of the control unit housing portion 132 to a top portion of the battery compartment 142. Thus, the handle 144 may extend above a portion of the housing 110 in which the motor 120 is housed. In some embodiments, an aperture or gap may be formed in the housing 110 by the handle 144 to enable the operator's hand to extend around the handle 144. The aperture may be referred to as a handle aperture 145.

The handle 144 may include a trigger 146 that may be operated by a finger of the operator while the operator holds the handle 144. Actuation of the trigger 146 may cause power from the battery 140 to be selectively applied to the motor 120 to turn the motor 120 based on control provided by the control unit 130. In some cases, the control unit 130 may include interlocks, protective functions or other control mechanisms that may sense various conditions of the blower 100 via sensors, switches or other mechanisms in order to selectively control the application of power to the motor 120 based on indications of user intent (e.g., via actuation of the trigger 146) and/or determinations regarding the state of the blower 100 as provided by the sensors, switches or other mechanisms. As can be seen from FIGS. 1 and 2, the trigger 146 extends downward from the handle 144 into the handle aperture 145.

It should be appreciated that although FIG. 1 shows an example in which the trigger 146 is used for selective powering of the motor 120, other example embodiments may employ a selector, switch, button or other such operative member in order to selectively control operation of the motor 120. Thus, for example, on/off, speed control or other operable functions for controlling the motor 120 may be performed using an operative member of any desirable form, and the trigger 146 is just one example. Some embodiments could also user other power sources instead of the battery 140.

The blower 100 may further include a blower tube 150 that is attached to housing 110 (or is a part of the housing 110) and through which air may be expelled. The blower tube 150 may define a blower tube axis 152, which defines an axial centerline of the blower tube 150. The blower tube 150 may include an inlet portion 154 and an outlet 156. The outlet 156 may be at a distal end of the blower tube 150 and the inlet portion 154 may be at an opposite end of the blower tube 150 proximate to the motor 120 and the battery 140.

In an example embodiment, the inlet portion 154 may be disposed proximate to an aperture array 158 including louvers, vanes, guide holes or other such apertures formed in the housing 110 to enable air to enter into the blower tube 150 responsive to operation of the motor 120 to be expelled via the outlet 156. In this regard, the operation of the motor 120 may cause an impeller or fan assembly 160 to rotate so that a low pressure area is generated to draw air into the inlet portion 154 through the aperture array 158 to be passed through the fan assembly 160 and expelled from the blower tube 150 at the outlet 156 to blow leaves, debris, or any other material.

In some cases, as shown in FIG. 1, the motor 120 and the fan assembly 160 may each be coaxial with the blower tube axis 152, so that air exiting the fan assembly 160 is generally moved (although such flow may be turbulent) along a direction substantially parallel to the blower tube axis 152. However, air entering into the inlet portion 154 is generally drawn in at an angle relative to the blower tube axis 152. In some cases, the angle may be about 90 degrees as shown by arrow 162 in FIG. 1. However, the angle could be an obtuse angle in some embodiments. As such, the air entering into the blower tube 150 (i.e., inlet air) may undergo a direction change relative to the direction such air takes through the fan assembly 160 and/or through the blower tube 150 as the air approaches the outlet 156 (i.e., as outlet air). In some cases, the louvers, vanes, guide holes or other such apertures formed in the housing 110 to embody the aperture array 158 may be strategically located to reduce the ability of noise from the motor 120 or airflow in the blower tube 150 from transmitting up to the operator's ears. Moreover, the louvers, vanes, guide holes or other such apertures of the aperture array 158 may be formed on each respective side portion of the housing 110 as shown in FIG. 1.

In an example embodiment, the battery compartment 142 may be disposed at a rearward most end of the housing 110, which may be above or even rearward of the inlet portion 154. Meanwhile, the control unit housing portion 132 may be disposed proximate to the motor 120 outside of the blower tube 150. Thus, in reference to FIG. 1, the battery 140 is located at a rear of the blower 100 and the outlet 156 is at the front of the blower 100. The handle 144 is generally held by the operator in a manner that places the handle 144 at the top with the motor 120 suspended below the handle 144. With these relative positions identified for reference, it can be appreciated that the half of the housing 110 that is removed in FIG. 1A is the left half, and thus the right half of the housing 110 remains.

As shown in FIG. 1, the blower 100 may be designed for balance and optimal ergonomics while being operated. As such, the handle 144 is generally designed to extend substantially horizontal to the ground plane while the operator holds the blower 100 in a natural or comfortable grip as shown by line 180, which is parallel to the ground plane. Meanwhile, the blower tube axis 152 lies at an angle $\alpha$ relative to line 180 and the ground plane. The angle α may be between 5 degrees and 90 degrees in some embodiments, and could be selected based on balancing the centers of mass of the various components of the blower 100, while also generating a natural downward cant angle that generally points the outlet 156 toward the ground when the blower 100 is held in its most comfortable and natural position by the operator. In some cases, the angle α may be about 25 degrees.

FIG. 1 shows example vectors indicative of the masses of various components of the blower 100. In this regard, $m_1$ represents the center of mass of the battery 140, which is relatively heavy and located at a rear portion of the blower 100, closest to the intersection of the blower tube axis 152 and line 180. Meanwhile, $m_2$ represents the smaller center of mass of the motor 120 and $m_3$ represents the center of mass of the control unit 130. When held at the handle 144, the "x" shape 182 represents a point about which the various centers of mass of the blower 100 are balanced (e.g., a balance point of the blower 100). Thus, $m_4$ represents the center of mass of the fan assembly 160, which lies forward of the handle 144, along with the centers of mass of the motor 120 and the control unit 130 to counter the larger weight of the battery 140. Providing the handle 144 at an angle relative to the blower tube axis 152, and distributing the masses as provided in FIG. 1 causes the blower 100 to have a natural downward cant angle when held in its ergonomically optimized, balanced condition.

As shown in FIGS. 1B and 2, the blower 100 of some example embodiments may further be provided with an eyelet 190. The eyelet 190 may be provided at a portion of the housing 110 that is both accessible and located for ergonomic advantage. In this regard, in accordance with one example embodiment, the eyelet 190 may be provided at a portion of the housing 110 at which the eyelet 190 can be accessed from the side of the blower 100.

The eyelet 190 may be formed as a separate piece that is attached to the housing 110, or the eyelet 190 could be integrated as a part of the housing 110 (e.g., the eyelet 190 could be a molded, plastic portion of the housing 110). The eyelet 190 could be made of the same material or a different material than the housing 110. Thus, for example, in some cases, the housing 110 may be molded plastic and the eyelet 190 could be a separate piece of molded plastic or metal that is attached to the housing 110 via a weld, snap fitting, screw or other fastener. Furthermore, in some cases, multiple eyelets may be provided.

In the example of FIGS. 1 and 2, the eyelet 190 is provided at a portion of the housing 110 that enables the eyelet 190 to extend upward toward the handle aperture 145. Moreover, when viewed from the side (as shown in FIG. 1B), the eyelet 190 extends into the handle aperture 145. Meanwhile, as shown in FIG. 2, because the handle 144 does not extend as wide as the housing 110 at a portion of the housing 110 that is below the handle 144, the eyelet 190 is also accessible from above. As such, for example, if a belt 192 (or harness) is worn with a hook 194, the hook 194 can extend into the eyelet 190 and the blower 100 may be suspended from the hook 194.

As shown in FIG. 1B, the eyelet 190 may be positioned substantially below the balance point 182. During operation, the operator may generally keep his/her index finger near the balance point 182 when the blower 100 is not in use. When the blower 100 is being operated, the operator may move the index finger forward to engage the trigger 146. By providing the balance point 182 at the handle 144, the blower 100 may naturally have the downward cant angle desired for optimal comfort and maneuverability. By placing the eyelet 190 directly below the balance point 182, the blower 100 may be suspended (e.g., by the hook 194 and the eyelet 190) without substantially altering the balance of the blower 100. The operator could therefore transport the blower 100 without touching the handle 190 and, because of the position of the eyelet 190 relative to the balance point 182, the downward cant angle may be maintained and the blower 100 may be relatively stable even when the operator is walking. Meanwhile, the operator could also or alternatively operate the blower 100 while the hook 194 engages the eyelet 190.

In an example embodiment, the orifice through which the hook 194 passes in the eyelet 190 may generally be round or oval in shape so that the hook 194 may be passed through and the blower 100 may be rotated up and down about an axis defined by the eyelet 190 to aim the blower 100 higher or lower. Positioning the eyelet 190 on the side (right or left) of the blower 100 may facilitate this axial rotation of the blower 100 while the blower rests on the hook 194.

By virtue of the fact that the eyelet 190 extends upward toward the handle aperture 145 at a portion where there are no other interfering structures immediately above the eyelet 190, the blower 100 may also or alternatively be aimed left and right in front of the operator. Accordingly, the operator may be enabled to point the blower tube 150 in front of the operator's path and move the blower 100 axially and laterally (and combinations thereof) to give a relatively wide range of motion for controlling the blower 100 while the blower 100 rests on the hook 194 (via the eyelet 190). Thus, the blower 100 can easily be transported and/or operated while the blower 100 rests on the hook 194 and is supported by a belt, harness or other such device.

It should be appreciated that although the hook 194 is directly attached to the belt 192, the hook 194 could instead be attached to an extension strap or other such member configured to expand the range of motion that is achievable while the blower 100 is suspended on the hook 194. Accordingly, the hook 194 may be mounted on any desirable structure to facilitate improving the maneuverability of the blower 100 without sacrificing stability.

In an example embodiment, the eyelet 190 may be positioned a specific distance (x) from the front and back of the handle aperture 145. Although not required, in some embodiments, the eyelet 190 may be positioned substantially equidistantly relative to the front and back of the handle aperture 145 (e.g., in the middle or midpoint of the handle aperture 145). This provides balance advantages (e.g., by putting the eyelet directly below the balance point 182), but also provides the eyelet 190 on the side of the blower 100 at a portion where there is space above the eyelet 190 by virtue of the fact that the handle 144 has a smaller width than the housing 110 at the portion of the housing 110 where the eyelet 190 is positioned.

Figure 3:
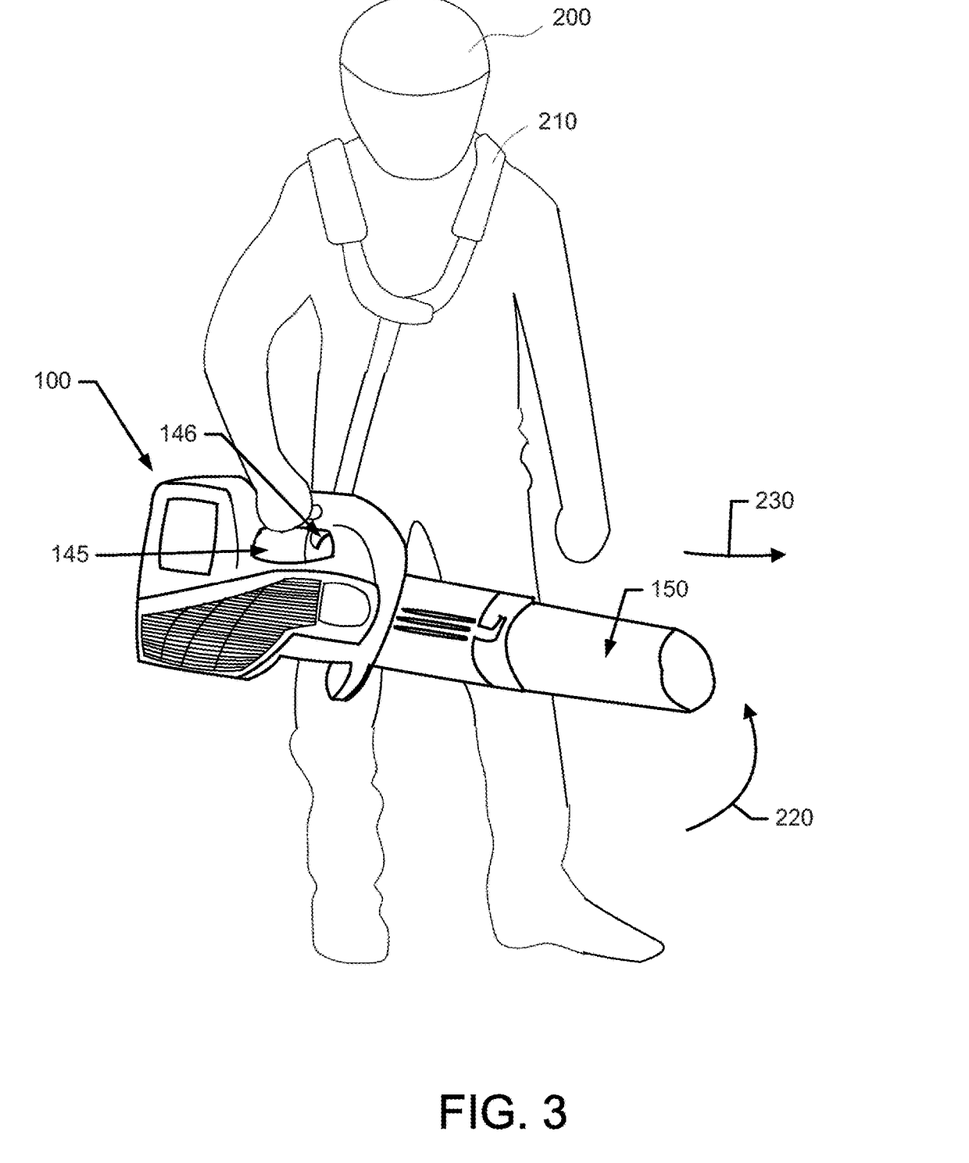
FIG. 3 illustrates an operator employing a blower while the blower is supported by a harness in accordance with an example embodiment.

FIG. 3 illustrates an example in which the blower 100 is in use by an operator 200 while being suspended by a harness 210. As shown in FIG. 3, the harness 210 may provide a support platform for the blower 100. It may be appreciated that a hook (like hook 194) may be positioned at a portion of the harness 210 to engage the eyelet 190 (not visible in FIG. 3). The operator 200 may then have freedom to enjoy a more ergonomic way of employing the blower 100, which will in turn make it possible for the operator 200 to work for a longer period of time without getting tired.

By positioning the eyelet on the side of the blower 100, the eyelet (and the hook to which it is engaged) is not in the way relative to the operator's hand. Thus, the operator 200 can freely move the blower 100 to direct the blower tube 150 to move up or down by rotating about the axis defined by the hook (as shown by arrow 220), or to move the blower tube 150 to aim right or left (as shown by arrow 230). The operator 200 could also take both hands off the blower 100 and still carry the blower 100 with both hands free to move equipment, objects or materials or do something else without setting the blower 100 down. If the battery is provided in a backpack (instead of on the blower itself), the example embodiment of FIG. 3 may be helpful since it will prevent the cable of the product from being dragged on the ground beside the operator.

A blower of an example embodiment may therefore include a housing, a blower tube, a fan assembly and an eyelet. The housing may include a handle portion defining a handle aperture. The blower tube may extend forward from the housing and define a tube axis. The fan assembly may be operably coupled to the blower tube to force air through the blower tube responsive to operation of a motor. The eyelet may be disposed on a side portion of the housing proximate to the handle aperture.

The blower of some embodiments may include additional features that may be optionally added either alone or in combination with each other. For example, in some embodiments, (1) the blower tube, motor and fan assembly are substantially forward of a balance point of the blower and a battery that powers the blower may be rearward of the balance point. The eyelet may be provided at a portion of the housing that is substantially in vertical alignment with the balance point when the blower is balanced about the balance point. In some cases, (2) the balance point is approximately at a longitudinal midpoint of the handle portion. In an example embodiment, (3) the eyelet may be disposed at a point along the handle aperture that is proximate to a midpoint of a longitudinal length of the handle aperture. In some embodiments, (4) the eyelet extends at least partially into the handle aperture. In some cases, (5) the blower may further include an aperture array provided at a portion of the housing to provide a path for air to the fan assembly. The aperture array may be defined by a plurality of vanes disposed at a portion of the housing between a top wall and a bottom wall of the housing. In such an example, the eyelet may be disposed above the aperture array on the top wall.

In some embodiments, any or all of (1) to (5) may be employed in addition to the optional modifications or augmentations described below. For example, in some embodiments, the tube axis (152) forms an angle relative to a ground plane, and wherein the angle is between about 5 degrees and about 55 degrees (e.g., about 25 degrees), although the angle could be anywhere between about 5 degrees and 90 degrees. Additionally or alternatively, the eyelet may be configured to be suspended by a hook on a belt or harness. Additionally or alternatively, the blower may be operable while the blower is suspended on the hook and the blower is movable axially about an axis defined by the hook and laterally. Additionally or alternatively, the blower may be battery powered and the blower further includes a battery compartment provided in a backpack or as part of the housing. Additionally or alternatively, the eyelet may be a molded portion of the housing or a separate component attached to the housing. Additionally or alternatively, the housing may be provided with a plurality of eyelets (e.g., one on each side to accommodate right or left handed usage).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blower comprising:
   a housing including a handle portion defining a handle aperture;
   a blower tube extending forward from the housing and defining a tube axis;
   a fan assembly operably coupled to the blower tube to force air through the blower tube responsive to operation of a motor; and
   an eyelet disposed on a side portion of the housing proximate to the handle aperture at a point along the handle aperture that is proximate to a midpoint of a longitudinal length of the handle aperture,
   wherein the blower tube, motor, and fan assembly are substantially forward of a center of mass point of the blower and a battery that powers the blower is rearward of the center of mass point, and
   wherein the eyelet is provided at a portion of the housing that is substantially in vertical alignment with the center of mass point when the blower is balanced about the center of mass point.

2. The blower of claim 1, wherein the center of mass point is approximately at a longitudinal midpoint of the handle portion.

3. The blower of claim 1, wherein the eyelet extends at least partially into the handle aperture.

4. The blower of claim 1, further comprising an aperture array provided at a portion of the housing to provide a path for air to the fan assembly, the aperture array being defined by a plurality of vanes disposed at a portion of the housing between a top wall and a bottom wall of the housing,
   wherein the eyelet is disposed above the aperture array on the top wall.

5. The blower of claim 1, wherein the tube axis forms an angle relative to a ground plane, and wherein the angle is between about 5 degrees and about 90 degrees.

6. The blower of claim 5, wherein the angle is about 25 degrees.

7. The blower of claim 1, wherein the tube axis forms an angle relative to a vertical line between the center of mass point of the blower and the eyelet, and wherein the angle is between about 5 degrees and about 90 degrees.

8. The blower of claim 7, wherein the angle is about 25 degrees.

9. The blower of claim 1, wherein the eyelet is configured to be suspended by a hook on a belt or harness worn by an operator.

10. The blower of claim 9, wherein the blower is operable while the blower is suspended on the hook and the blower is movable axially about an axis defined by the hook and laterally in front of the operator.

11. The blower of claim 1, wherein the blower is battery powered and the blower further comprises a battery compartment provided in a backpack or as part of the housing.

12. The blower of claim 1, wherein the eyelet is a molded portion of the housing.

13. The blower of claim 1, wherein the eyelet is a separate component attached to the housing.

14. The blower of claim 1, wherein the housing comprises a plurality of eyelets.

15. A blower comprising:
- a housing including a handle portion defining a handle aperture;
- a blower tube extending forward from the housing and defining a tube axis;
- a fan assembly operably coupled to the blower tube to force air through the blower tube responsive to operation of a motor; and
- an eyelet disposed proximate a center of mass point of the blower and configured to enable suspension of the blower without substantially altering balance of the blower,
- wherein the blower tube, motor, and fan assembly are substantially forward of the center of mass point of the blower and a battery that powers the blower is rearward of the center of mass point, and
- wherein the eyelet is provided at a portion of the housing that is substantially in vertical alignment with the center of mass point when the blower is balanced about the center of mass point.

16. The blower of claim 15, wherein the center of mass point is approximately at a longitudinal midpoint of the handle portion.

17. The blower of claim 15, wherein the eyelet is provided at a point along the handle aperture that is proximate to a midpoint of a longitudinal length of the handle aperture.

18. The blower of claim 17, wherein the eyelet extends at least partially into the handle aperture.

* * * * *